Figure 1:
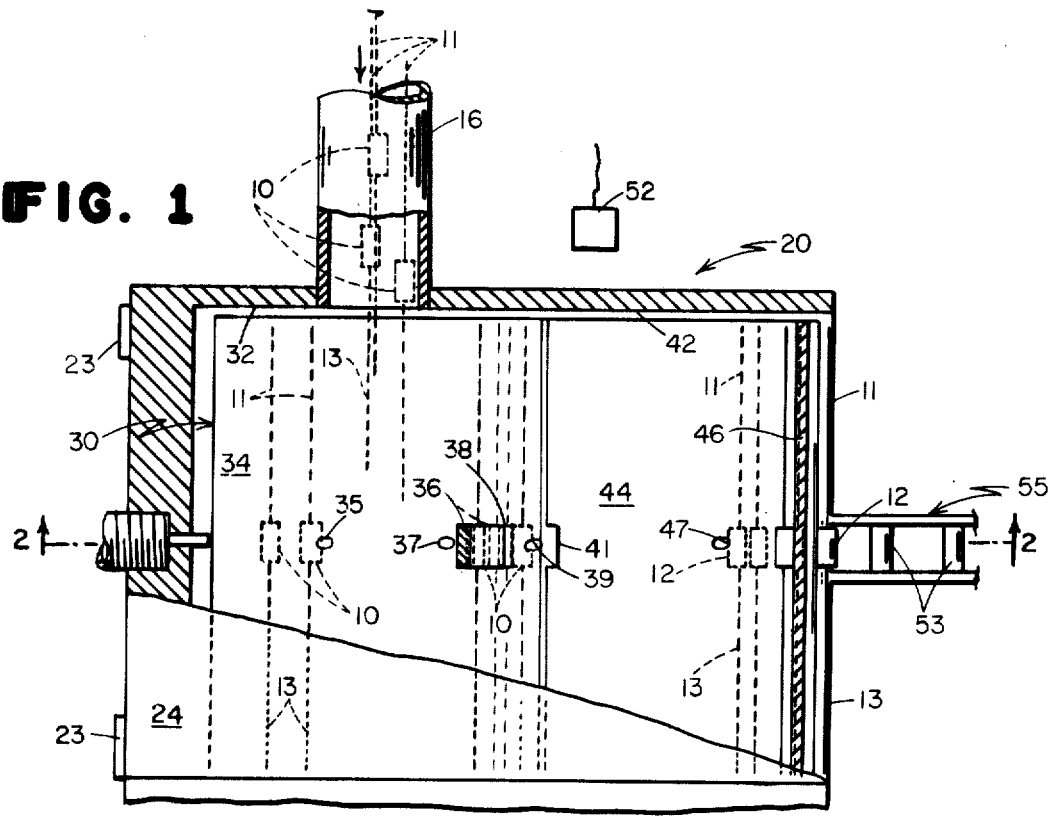

United States Patent
Kearney et al.

[11] 3,893,691
[45] July 8, 1975

[54] COMPONENT FEEDING APPARATUS
[75] Inventors: David Kearney; Harold Kontrovitz, both of Keene, N.H.
[73] Assignee: Markem Corporation, Keene, N.H.
[22] Filed: Oct. 11, 1973
[21] Appl. No.: 405,393

[52] U.S. Cl. ................ 302/2 R; 221/278; 302/11
[51] Int. Cl.² .................................... B65G 53/04
[58] Field of Search .............. 302/2 R, 11–13, 302/31; 221/278

[56] References Cited
UNITED STATES PATENTS
| | | | |
|---|---|---|---|
| 1,149,595 | 8/1915 | Pipe et al. | 221/278 X |
| 3,042,253 | 7/1962 | Dougherty | 221/278 X |
| 3,343,885 | 9/1967 | Lundeberg | 221/278 X |

FOREIGN PATENTS OR APPLICATIONS
1,055,615   5/1952   France .................. 221/278

*Primary Examiner*—Evon C. Blunk
*Assistant Examiner*—Jeffrey V. Nase

[57] ABSTRACT

Component feeding apparatus for discrete parallelized feeding of axially extended components, such as diodes and resistors having a central enlarged portion with axially extended leads, comprising one or more chambers having a generally closed curved inner surface for guiding the components therearound in a closed path, air jet passages communicating through said surface at an angle for blowing the components around the surface, an inlet for feeding the components into the chamber and a tangential slot for feeding a series of parallelized components from said chamber while others of said components continue to move around said surface. When two chambers are used, there is provided a curved transition passageway connecting the outlet slot of the inlet chamber with the tangential inlet slot of the outlet chamber.

11 Claims, 5 Drawing Figures

COMPONENT FEEDING APPARATUS

This invention relates to component feeding apparatus and more particularly to apparatus for discrete parallelized feeding of axially extended components such as diodes and resistors having a central enlarged portion with axially extended leads.

Axial leaded electronic components, such as diodes and resistors, are, at some time in the manufacturing process, handled in compartmented trays, tote boxes, or tubes. Components tested for electrical or electronic characteristics are sorted according to value of performance and then taken to suitable identifying and marking equipment wherein the value, company, and/or logo are marked on the component in a process commonly called branding.

At the present, those components with leads made from nonmagnetic materials can be fed into branding machines at a rate of up to 10,000 parts per hour, commonly using feeding devices such as vibratory hoppers and bowls leading to mechanical devices called trickledowns or chutes, and then past the printing wheel of the conventional printing machine. Sometimes, the operators hand feed the trickledowns and at best can achieve a rate of only 8,000 parts per hour. In the case of the vibratory feeding, the equipment must sometimes include a device to sense electrical orientation and provide a means for aligning all the passing components into one electrical direction. In the case of the operator hand feeding the branding equipment, he must maintain the preoriented component in its correct electrical position in the act of picking up and placing the component into the trickledown or chute. The trickledown, chute, and vibratory bowls and hoppers are subject to frequent jamming wherein the operator must stop the equipment, clear the machine, realign or discard the entangled components, restart the branding equipment.

Those components whose leads are magnetic in nature are commonly handled and fed from magnetic bins, or some other suitable device using magnets. The components must also be electrically oriented, and generally production rates are in the order of 20,000 parts per hour.

It is a major object of the present invention to provide apparatus for discrete parallelized feeding of axially extended components, especially axial leaded electronic components.

It is a further object of the invention to provide apparatus capable of achieving a feed rate far in excess of that of the present state of the art, particularly in the case of the nonmagnetic components.

Still further objects of the invention are: to maintain the predetermined electrical orientation of the conveyed component; to convey the component without entanglement and jamming; and to convey components regardless of whether the leads or bodies are magnetic or nonmagnetic material.

This is accomplished, according to the present invention, by providing novel component feeding apparatus for discrete parallelized feeding of axially extended components, for example, diodes and resistors having a central enlarged portion with axially extended leads, said apparatus comprising one or more chambers, each having a generally closed curved inner surface for guiding the components therearound in a closed path, air jet passages communicating through said surface at an angle for blowing the components around the surface, an inlet for feeding the components into the chamber and a tangential slot for feeding a series of parallelized components from said chamber while others of said components continue to move around said surface. When two chambers are used, there is provided a curved transition passageway connecting the outlet slot of the inlet chamber with the tangential inlet slot of the outlet chamber.

Figure 2:
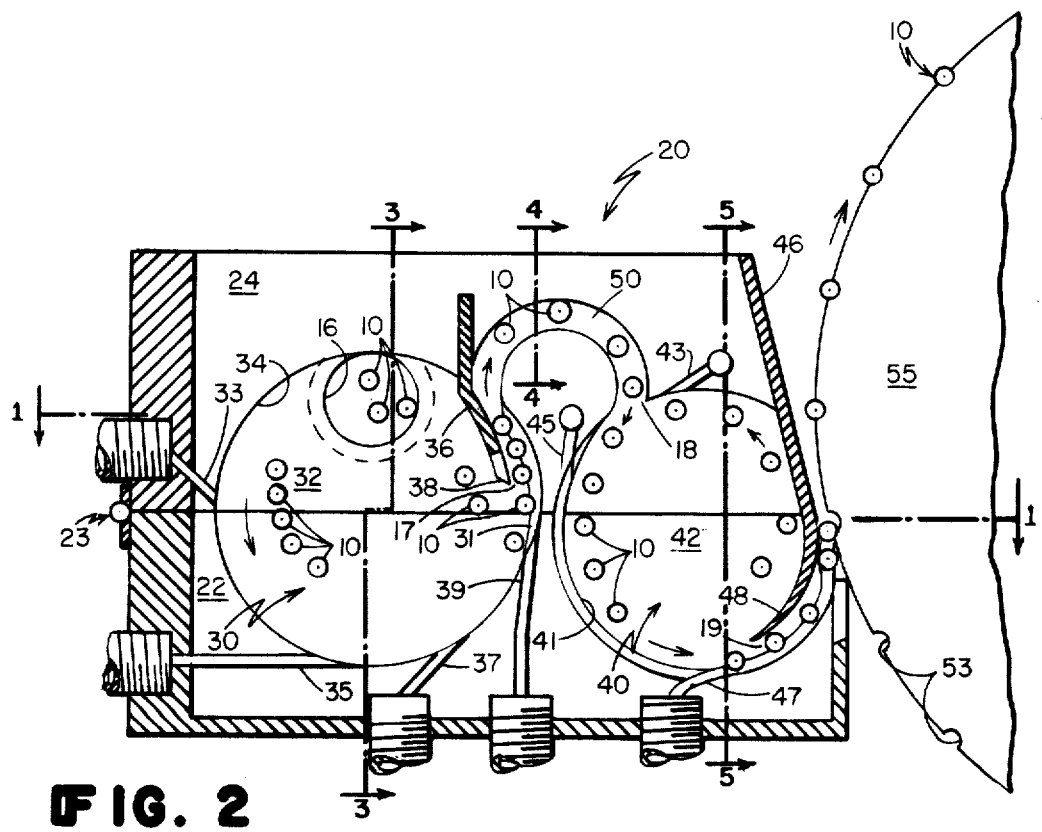
Figure 3:
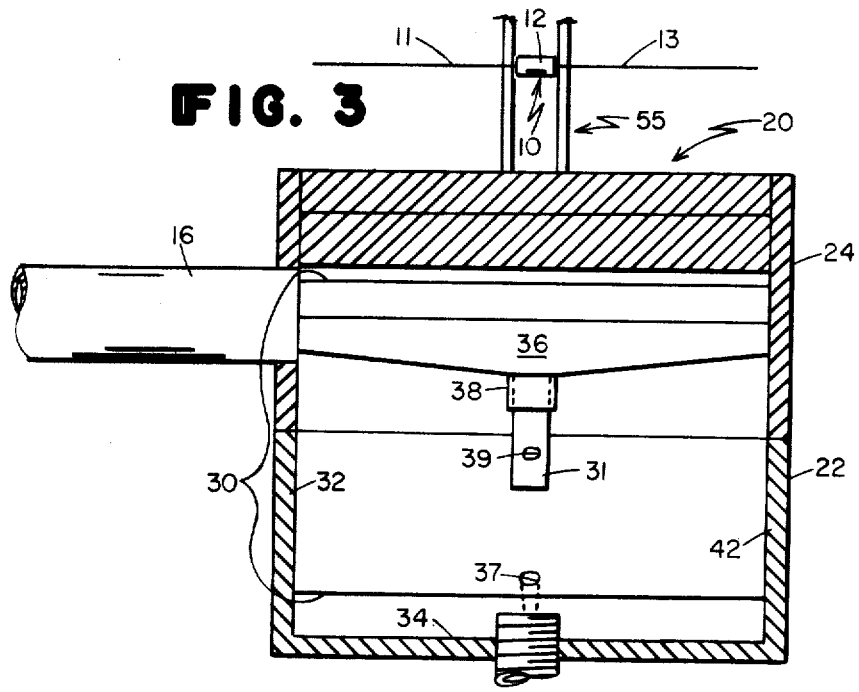
Figure 4:
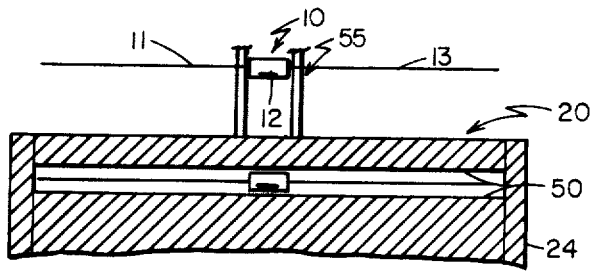
Figure 5:
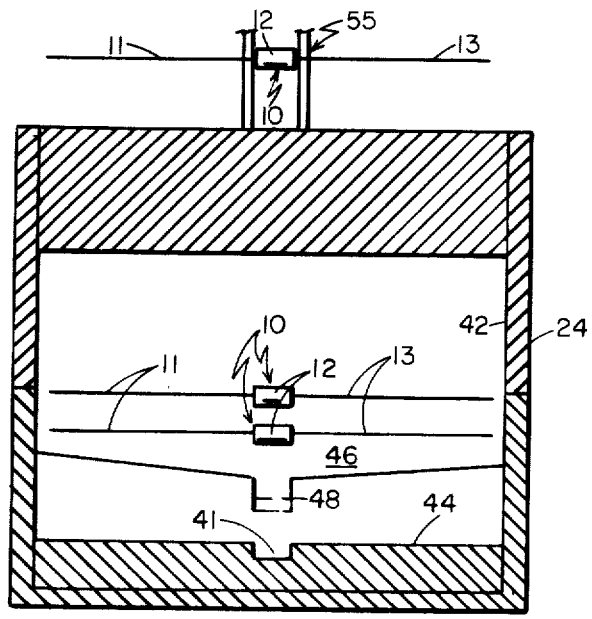

For the purpose of fully explaining the above and still further objects and features of the invention, reference is now made to the following detailed description of a preferred embodiment thereof, together with the accompanying drawings, wherein:

FIG. 1 is a top view, partly broken away and in section, of apparatus according to the invention;

FIG. 2 is a front sectional view of the apparatus of FIG. 1, taken on line 2—2 thereof; and FIGS. 3 through 5 are side sectional views of the apparatus of FIG. 1, taken, respectively, on lines 3—3, 4—4 and 5—5 of FIG. 2.

Referring to the drawings, a typical component with which the apparatus of the invention is concerned is shown as an axially leaded electronic component, generally designated 10, having a central enlarged body portion 12 wherein is contained the electronic element, generally covered with either plastic or glass but which may be of metal or other material, with oppositely axially extending wire leads 11, 13 of either magnetic or nonmagnetic material generally in axial alignment with each other and the body portion. The proportions between the body diameters and lengths, and lead diameters and lengths vary greatly in the components generally manufactured in the electronics industry.

The component feeding apparatus of the present invention includes a body, generally designated 20, which may be of clear plastic, metal, or other suitable material, having a base portion 22 and a top portion 24 connected by hinges 23 so that body 20 may be opened for access to its interior.

Within base 20 is provided a pair of generally cylindrical chambers, inlet chamber 30 and outlet chamber 40, defined by end walls 32, 42, respectively, and the generally closed, curved inner surfaces 34, 44, respectively, extending therebetween for guiding components 10 therearound in a closed path. In order to prevent their turning over end for end, that is, reversal, of the components 10 within chambers 30, 40, the maximum transverse dimension of inner surfaces 34, 44, that is, their diameters in the case of a cylindrical chamber as shown herein, should be substantially less than the axial length thereof between end walls 32, 32 or 42, 42. The actual axial length of the chambers should be but slightly greater than the axial length of components 10.

A series of air jet passages 33, 35, 37, 39 communicating through surface 34 of inlet chamber 30, generally centrally thereof and at an angle thereto, are provided for blowing components 10 around surface 34, said air jet passages having suitable fittings at their outer ends for connecting them to a suitable source of air pressure (not shown).

An axially extending inlet tube 16, having its opening through an end wall 32 of chamber 30 and generally tangential to said chamber, is provided for air conveying of components 10 from any suitable source, such as a conventional vibratory feeder (not shown), into inlet chamber 30. Other types of inlet openings into said chamber may also be used, including that hereinafter described in connection with outlet chamber 40. Air jets 33, 35, 37, in addition to creating a circular flow of air which carries components 10 around surface 34, also draw air into chamber 30 through inlet tube 16, aiding in the movement of components 10 therethrough.

Inlet chamber 30 is also provided with a generally tangential outlet slot 17 for feeding a series of parallelized components 10 from the chamber while others of the components continue to move around surface 34. Said outlet slot is initially defined by a axially extending guide blade 36 mounted in upper portion 24 of base 20 and having a forwardly extending central tab 38, said guide blade being spaced inwardly from and overlapping an arcuate portion of surface 34. A portion of surface 34 adjacent tab 38 has a central groove 31 for receiving the enlarged central portions 12 of components 10 for guiding them into slot 17. Guide blade 36 has two purposes, namely, to guide parallelized components 10 into outlet slot 17 and to divert surplus components 10 for continued movement around surface 34.

Outlet chamber 40 is provided with a tangential inlet slot 18 in its surface 44 for feeding components 10 thereinto, said inlet slot 18 being connected by curved transition passageway 50 to the outlet slot 17 of inlet chamber 30 as defined between its guide blade 36 and the underlying transverse portion of surface 34. Transition passageway 50, as best shown in FIGS. 2 and 4, is of a width only slightly greater than the transverse dimension of the body portion 11 of a component 10. The curved formation of transition passageway 50 prevents components 10 from turning sideways in said passageway and hence possible jamming therein.

Similarly to inlet chamber 30, outlet chamber 40 is provided with a series of air jet passages 43, 45, 47 communicating through surface 44 of outlet chamber generally centrally thereof and at an angle thereto for blowing components around surface 44, as well as aiding in causing air flow through transition passageway 50 to move components 10 therethrough.

Also, similarly to inlet chamber 30, outlet chamber 40 is provided with a generally tangential outlet slot 19 for feeding a series of parallelized components 10 from outlet chamber 40 to feed wheel 55 while others of the components continue to move around surface 44. Said slot is defined by a transversely extending guide blade 46 mounted on upper portion 24 of base 20 and having a forwardly extending central tab 48, said guide blade being spaced inwardly from and overlapping a transverse portion of surface 44 to provide outlet slot 19 for storing therein a parallelized series of components 10 for discrete removal from the open outer end of said slot, individual components 10 by feed wheel 55. A portion of surface 44 extending from adjacent to inlet slot 18 to the open end of outlet slot 19 and therealong has a central groove 41 for receiving the enlarged central portions 12 of components 10 for guiding them into said slot and retaining them therein. Guide blade 46 also has two purposes, namely, to guide parallelized components 10 into outlet slot 19 and to divert surplus components 10 for continued movement around surface 44. A photocell 52 may be used to observe the concentration of components 10 in chamber 40 and cut off the infeed thereof through inlet tube 16 by any suitable means such as stopping the vibratory feeder therefor if the concentration of components in chamber 40 becomes too high for reliable operation.

Feed wheel 55 is conventional, having a pair of spaced elements with notches 53 for receiving the leads 11, 13 of components 10 with the body portions 12 thereof between said feed wheel elements.

In operation, the components 10 are placed in the end of the inlet tube 16 either by use of a tube full of components mounted on a vibratory feeder, or some other suitable device, by an operator working directly with his hands, or in some other effective way. In most cases, as with diodes or capacitors, electrical orientation has been previously performed and all the components are placed in one direction to preserve the alignment. Since the feeding apparatus of the invention maintains this orientation, the components emerge into the feed wheel 55 in a like manner.

The components enter inlet chamber 30, en masse, and are caught up in the air whirl created by the air jets 33, 35, 37. As a result, the components move about the outer surface 34 of inlet chamber 30 in a counterclockwise direction as appears in FIG. 2. Upon reaching the position of the guide blade 36, the components in circulation split, some going through outlet slot 17 into the transition passage 50 and the remainder staying in circulation. The components in circulation then complete successive loops and eventually split off into transition passage 50. At the same time, additional components are entering from inlet tube 16, intermingling with those in circulation, thus replenishing the supply.

The components in transition passage 50 are blown through inlet slot 18 into outlet chamber 40 due to the forces exerted by the air jet 39. Entrance to the transition passage aided by the guide groove 31, this helping to align the components, maintaining the component axes in a position perpendicular to their direction of travel.

Upon entrance into the output chamber 40, the components 10 are caught up in the counterclockwise air whirl created by air jets 43, 45, 47, the components 10 thus traveling along the output chamber surface 44 until they reach guide blade 46. The guide groove 41 in the chamber surface 44 acts to help align the components prior to pickup by the feed wheel 55. The circulating components split upon reaching guide blade 46 and some are stored in outlet slot 19. The feed wheel 55 acts as an escapement, allowing the components to exit from slot 19 when a notch 53 in the rotating feed wheel periphery reaches the open end of the exit slot. At guide blade 46, some of the components split off and remain in the chamber 40 and continue to circulate under the forces exerted by the air whirl. These then complete successive loops and eventually split off into exit slot 19. The supply of components is replenished by those emerging from transition passageway 50 and may be controlled by photocell 52 as explained above. The components are carried away by feed wheel 55 to successive equipment.

What is claimed is:

1. Component feeder apparatus for discrete parallelized feeding of axially extended components, said apparatus comprising a chamber having a generally closed curved inner surface for guiding said components therearound in a closed path, the maximum transverse dimension of said inner surface being substantially less than its axial dimension to prevent reversal of said components within said chamber air jet passages communicating through said surface at an angle thereto for blowing said components around said surface an inlet for feeding said components into said chamber and a tangential slot for feeding a series of parallelized components from said chamber while others of said components continue to move around said surface.

2. Component feeding apparatus as claimed in claim 1, wherein
said inlet is in said curved surface.

3. Component feeding apparatus as claimed in claim 1, wherein
said inner surface is cylindrical.

4. Component feeding apparatus as claimed in claim 1, wherein
said inlet is in an end wall of said chamber.

5. Component feeding apparatus for discrete parallelized feeding of axially extended components having a central enlarged portion with axially extended leads, said apparatus comprising
inlet and outlet chambers each having closed parallel planar end walls and a generally closed curved inner surface extending therebetween for guiding said components therearound in a closed path, the maximum transverse dimension of said inner surface being substantially less than its axial dimension to prevent reversal of said components within said chamber air jet passages communicating through said surface generally centrally thereof at an angle thereto for blowing said components around said surface an inlet for feeding said components into said inlet chamber a tangential inlet slot in said surface of said outlet chamber for feeding said components into said outlet chamber a tangential outlet slot in each of said chambers for feeding a series of parallelized components from said chambers while others of said components continue to move around said surfaces, said tangential outlet slot being initially defined by a transversely extending guide blade spaced inwardly from and overlapping a transverse portion of said surface and said slot and a portion of said surface adjacent thereto having a central groove for receiving the enlarged central portion of said components for guiding them through said slot and a curved transition passageway connecting said outlet slot of said inlet chamber with said inlet slot of said outlet chamber.

6. Component feeding apparatus for discrete parallelized feeding of axially extended components having a central enlarged portion with axially extended leads, said apparatus comprising
a chamber having closed parallel planar end walls and a generally closed curved inner surface extending therebetween for guiding said components therearound in a closed path, the maximum transverse dimension of said inner surface being substantially less than its axial dimension to prevent reversal of said components within said chamber air jet passages communicating through said surface generally centrally thereof at an angle thereto for blowing said components around said surface an inlet for feeding said components into said chamber and a tangential slot for feeding a series of parallelized components from said chamber while others of said components continue to move around said surface,
said slot and a portion of said surface adjacent thereto having a central groove for receiving the enlarged central portion of said components for guiding them through said slot.

7. Component feeding apparatus as claimed in claim 6, wherein
said tangential slot is initially defined by a transversely extending guide blade spaced inwardly from and overlapping a transverse portion of said surface.

8. Component feeding apparatus as claimed in claim 7, wherein
said guide blade has a forwardly extending central tab for initially engaging the enlarged central portion of said components.

9. Component feeding apparatus for discrete parallelized feeding of axially extended components, said apparatus comprising
inlet and outlet chambers each having a generally closed curved inner surface for guiding said components therearound in a closed path air jet passages communicating through said surfaces at an angle thereto for blowing said components around said surfaces an inlet for feeding said components into said inlet chamber a tangential inlet slot in said surface of said outlet chamber for feeding said components into said outlet chamber a tangential outlet slot in each of said chambers for feeding a series of parallelized components from said chambers while others of said components continue to move around said surfaces and a transition passageway connecting said outlet slot of said inlet chamber with said inlet slot of said outlet chamber.

10. Component feeding apparatus as claimed in claim 9, wherein
the transverse dimension of said transition passageway is at least as great as the axial dimension of said component.

11. Component feeding apparatus as claimed in claim 9, wherein
said transition passageway is curved.

* * * * *